United States Patent [19]
Smith

[11] Patent Number: 5,746,116
[45] Date of Patent: May 5, 1998

[54] RAPID TOASTING APPARATUS

[75] Inventor: Mark J. Smith, Ovilla, Tex.

[73] Assignee: APW/Wyott Foodservice Equipment Company, Dallas, Tex.

[21] Appl. No.: 847,676

[22] Filed: Apr. 28, 1997

[51] Int. Cl.$^6$ .............................. A47J 37/00; A47J 37/08
[52] U.S. Cl. ..................... 99/386; 99/389; 99/443 C; 99/477; 99/373; 219/388; 219/400
[58] Field of Search ............... 99/325–333, 385–387, 99/388, 389–391, 400, 401, 423, 443 R, 427, 443 C, 446–450, 477–479, 372–377; 126/21 A; 219/388, 400, 521; 426/243, 523

[56] References Cited

U.S. PATENT DOCUMENTS

| | | | |
|---|---|---|---|
| 3,589,274 | 6/1971 | Murray | 219/388 X |
| 3,646,879 | 3/1972 | Palmason et al. | 99/443 X |
| 3,712,480 | 1/1973 | Houssa | 99/386 X |
| 3,869,969 | 3/1975 | Sharp | 99/391 X |
| 4,189,631 | 2/1980 | Baker et al. | 219/388 |
| 4,261,257 | 4/1981 | Henderson et al. | 99/386 |
| 4,286,509 | 9/1981 | Miller et al. | 99/391 X |
| 4,386,558 | 6/1983 | Holman et al. | |
| 4,404,898 | 9/1983 | Chaudoir | 99/331 |
| 4,421,015 | 12/1983 | Masters et al. | 426/243 X |
| 4,465,701 | 8/1984 | Holman et al. | |
| 4,530,276 | 7/1985 | Miller | 99/386 |
| 4,534,987 | 8/1985 | Holman et al. | |
| 4,962,695 | 10/1990 | Northrup, Jr. | 99/427 X |
| 5,077,072 | 12/1991 | Sieradzki | 426/523 |
| 5,473,975 | 12/1995 | Bruno et al. | 99/447 X |

OTHER PUBLICATIONS

RT–2VSE "Energy Saver", RT–VSHO High Output Horizontal Conveyor Toasters, 1993 Merco Products Inc.
"Toast King", Hatco, Electric Conveyor Toasters, undated.
"Toast–Rite", Hatco, Electric Conveyor Toasters, undated.
"Toast–Qwik", Hatco, Electric Conveyor Toasters, undated.
"Conveyor Food Toasters, Models TC120 and TC44", Toastmaster, Foodservice Equipment, undated.
"Conveyor Food Toasters, Models TC120R and TC44R", Toastmaster, Foodservice Equipment, undated.
"Electric Conveyor Toasters", Installation and Operating Manual, Model: Toast–Qwik, Hatco, Jun. 1994.
"Blazing Bagels Conveyor Toaster", Holman Cooking Equipment, Inc., Jun. 1995.
"Conveyor Toasters With Security Features", Holman Cooking Equipment, Jun. 1995.
"Conveyor Toast & Hold With High Volume Bun Mode", Holman Cooking Equipment, Inc., Sep. 1995.
"Conveyor Toast & Hold", Holman Cooking Equipment, Inc., Jun. 1995.
"Dual–Purpose Double Conveyor Toaster", Holman Cooking Equipment, Inc., Sep. 1995.
"High Volume Conveyor Toaster", Holman Cooking Equipment, Inc., Dec. 1995.
"Conveyor Toasters With 8" Extended Conveyor, Batch Loading Area, Holman Cooking Equipment, Aug. 1995.
"Conveyor Toasters", Holman Cooking Equipment, Jan. 1996.
Holman Cooking Equipment, Operator's Manual, Holman Conveyor Toasters Model B910, Jan. 31, 1996.

*Primary Examiner*—Timothy F. Simone
*Attorney, Agent, or Firm*—Gardere & Wynne, L.L.P.

[57] ABSTRACT

An improved toasting apparatus is disclosed including a variable speed conveyor belt for conveying products through the toaster; a bottom heating element positioned below the conveyor belt, the bottom heating element including variable control for controlling the amount of heat provided by the bottom heating element; a drying zone including a first plurality of upper heating elements positioned above the conveyor; a toasting zone including a second plurality of upper heating elements; and wherein the bottom heating element and the first and second plurality of upper heating elements are controlled individually and independently.

18 Claims, 3 Drawing Sheets

RAPID TOASTING APPARATUS

TECHNICAL FIELD

The invention relates to an improved toasting apparatus or oven, and in particular, to an apparatus for rapid toasting of non-uniform bakery goods such split bagels that is also adaptable for use in toasting uniform products such as bread slices.

BACKGROUND

Due to the growing popularity of specialty bakery items such as bagels and English muffins, it is desirable to be able to toast a bagel or English muffin as rapidly as possible in order to satisfy customer demand in a operation such as a restaurant, convenience store or coffee shop. Toasting a moist or dense non-uniform bakery item, such as a split bagel, can however, present several problems, especially when it is desired to conduct the toasting in a high volume commercial operation.

The process of toasting a dense or moist product such as a split bagel involves two phases. First, the product is heated to drive off surface moisture. Next, the bagel is toasted to the desired color. Preferably, both phases of the operation are conducted at a temperature and over a time period that results in a uniform product of the desired color and consistency.

However, the amount of heat needed to accomplish the two phases is variable. Further, due to the differences in the two surfaces of a split bagel, uniform heating on both sides of the bagel will result in a less than desirable product. Thus, the toasting apparatus should be capable of applying different levels of heat during the two different phases, i.e., the drying and toasting phases and also capable of applying different amounts of heat to the two different sides of the product. Moreover, if the process is conducted at too high a temperature, or too long a period, the resulting product may appear toasted from a distance, but closer examination will reveal that the product is actually "microburned" or burned in small areas. Additionally, if the toasting operation takes an excessive period of time, the delay in receiving the toasted product may lead to customer dissatisfaction and/or the selection of alternative products.

The toasting apparatus should be adaptable to toasting other products, such as bread slices. Thus, there exists a need for an improved toasting apparatus that can toast a moist or dense, non-uniform product such as a split bagel in a minimum period of time and which is also adaptable to toasting a more uniform product such as bread slices.

SUMMARY OF THE INVENTION

The present invention is an improved toasting apparatus or oven that is adapted to toast non-uniform products such as bagels or English muffins in a minimum period and which is also adaptable for use in toasting uniform products such as bread slices. The apparatus includes a bottom heating element, a plurality of top heating elements, individually controlled top front and top back elements and a variably speed conveyor for carrying products through the apparatus. The bottom, top front and top back heating elements are individually and independently controlled with a combination infinite and on/off controls for controlling the amount of heat applied to products passing through the apparatus. The conveyor is equipped with variable speed control to control the rate at which products are carried through the unit.

DETAILED DESCRIPTION

Figure 1:
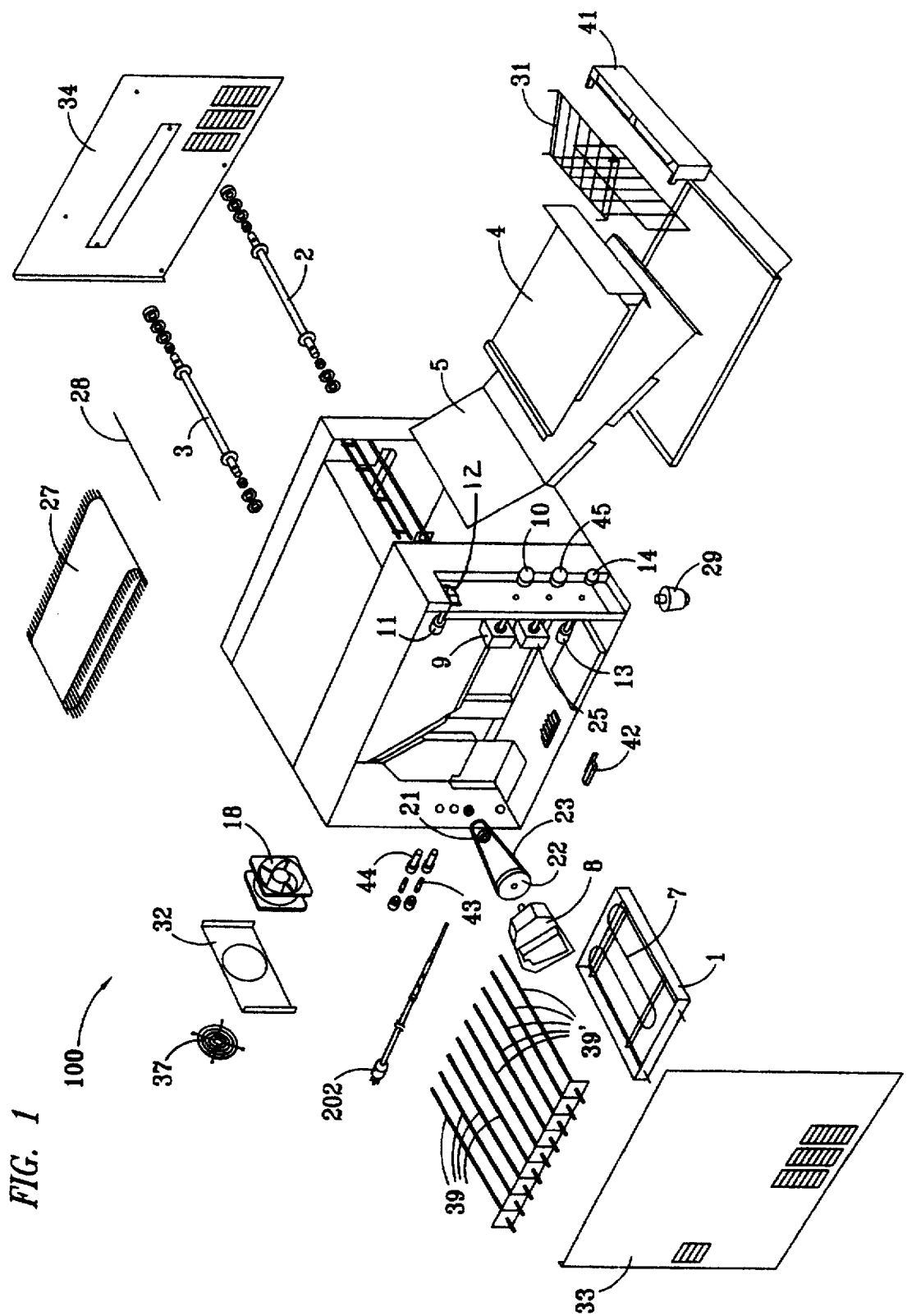
FIG. 1 is an exploded view of the toasting apparatus of the present invention.
Figure 2:
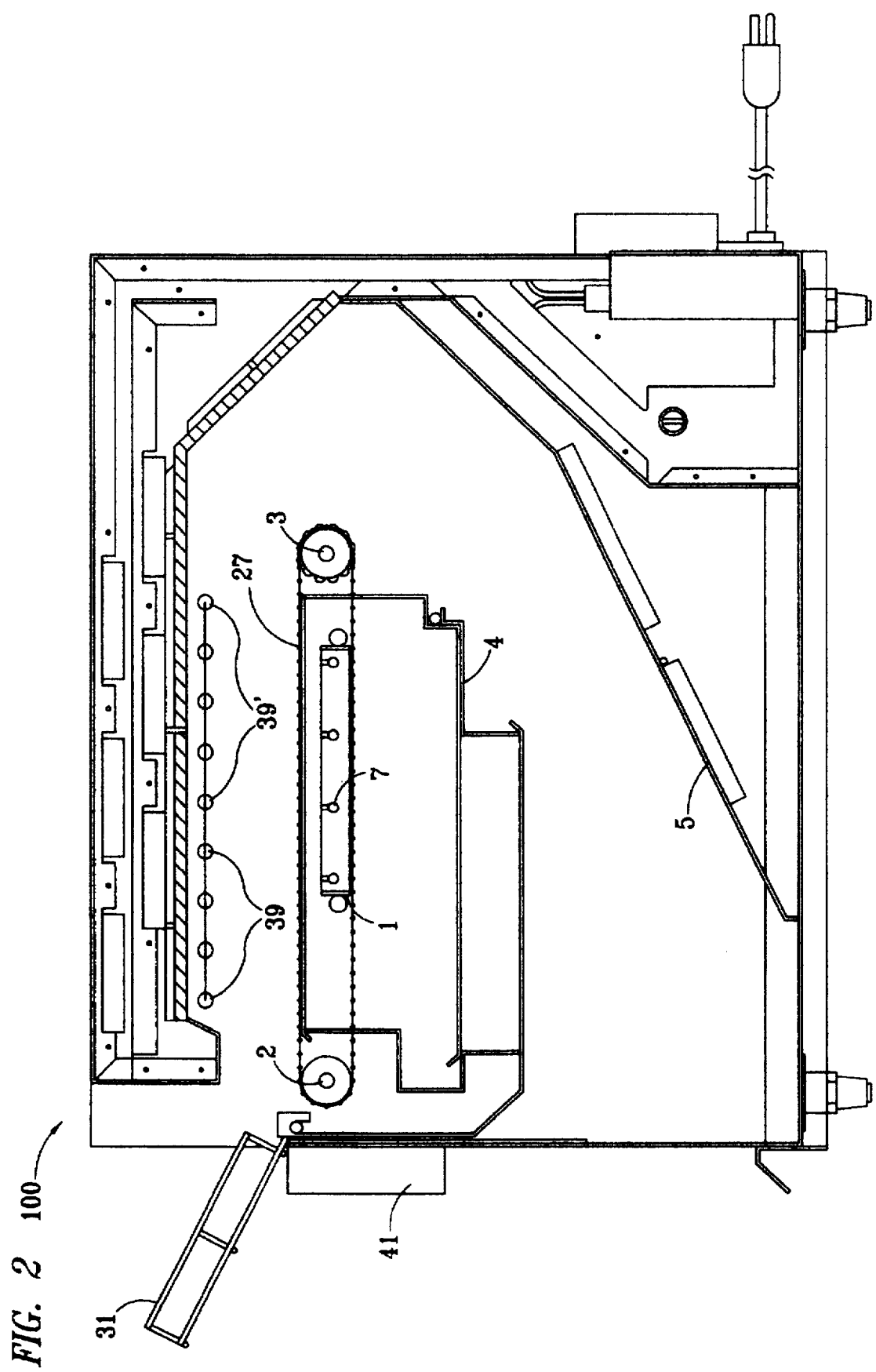
FIG. 2 is a cross-sectional view of the toasting apparatus taken through the center of the apparatus.
Figure 3:
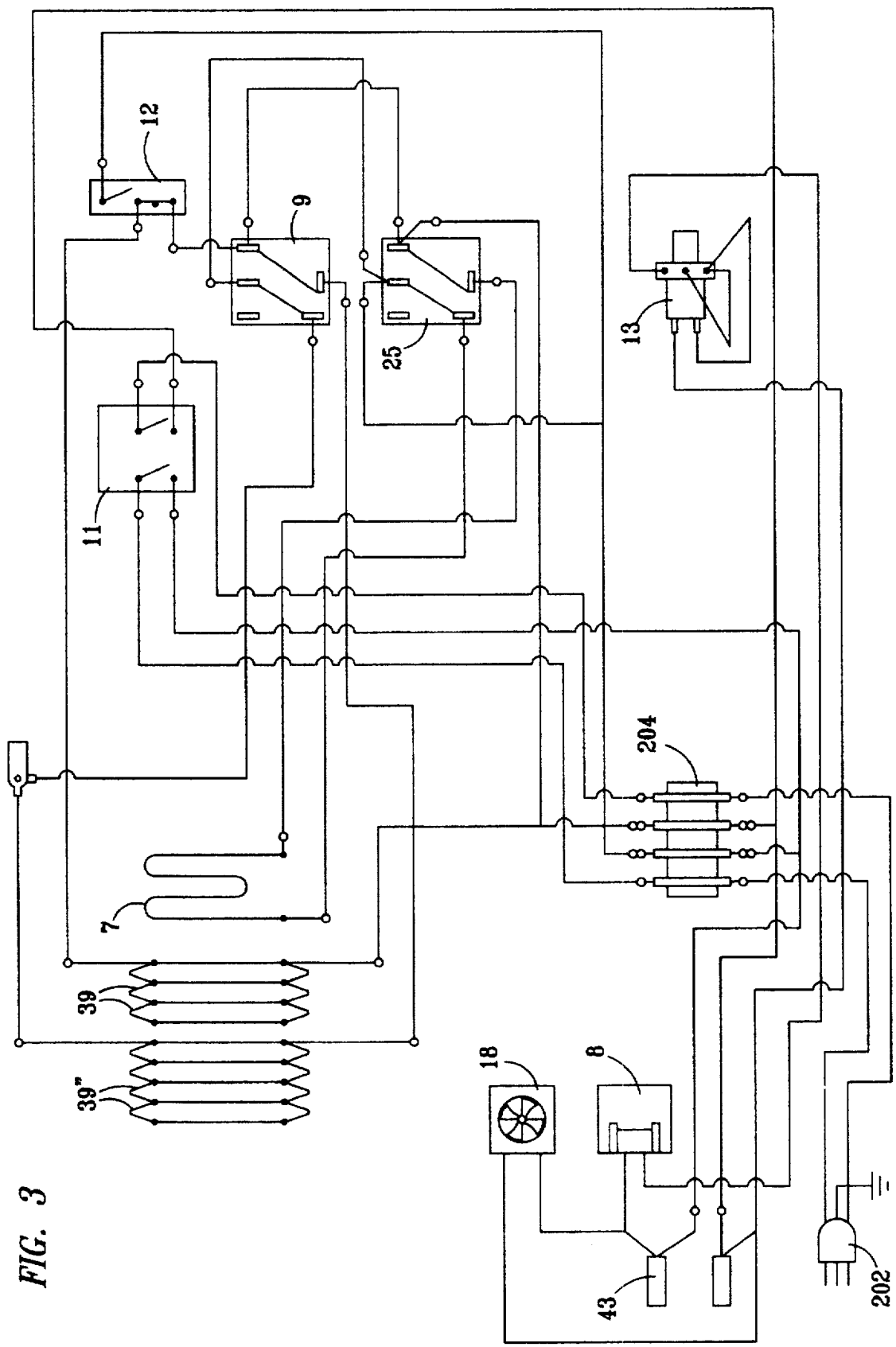
FIG. 3 is a schematic diagram of the wiring and controls of the apparatus.

Referring now to FIGS. 1–3, the improved toasting apparatus 100 of the present invention is illustrated. The apparatus is equipped with a bottom heating rack 1 in which a bottom heating element 7 is mounted. As illustrated, bottom heating element 7 is a sinusoidally configured continuous element, however, other element configurations are possible. Preferably, bottom heating element 7 is a 1300 to 2000 watt radiant heating element controlled with an infinite variable controller 25 including a knob or dial 10 that adjusts the heating element temperature. In one embodiment of the invention, the bottom heating element 7 is a 1300 watt element. The infinite controller 25 adjusts the heating element temperature by cycling the element on and off in a timed ratio according to the setting of dial 10. A reflector plate 4 is positioned below is positioned in the unit below the bottom heating rack 1.

As illustrated, the toasting apparatus also includes first and second pluralities of top or upper heating elements 39 and 39', respectively. Preferably, the top heating elements 39 are each 350 to 500 watt radiant heating elements. In one embodiment of the invention, a total of nine 350 watt heating elements are used, with the front four of the nine top elements 39 controlled with a rocker-type on/off switch 12 and the rear five units 39' controlled with an infinite controller 9. In this embodiment, the front four elements 39 are utilized in on and off modes depending on the position of switch 12 and the rear five elements 39' are adjustably controlled with the infinite controller 9. Infinite controller 9 adjusts the temperature of the rear heating elements 39' by cycling the element on and off in a timed ratio according to the setting of dial 45.

Alternatively, a separate infinite controller could be utilized in place of the rocker switch 12 to provide a greater degree of control. However, for most applications, the combination of five of the elements 39' with infinite control and four of the elements 39 with on/off control is adequate.

Thus, the bottom heating element 7, front top heating elements 39 and rear top heating elements 39' may be adjusted independently of each other to optimize the amount of heat supplied during the toasting operation.

In order to prevent damage to the apparatus from overheating, the apparatus is equipped with a limiting thermostat 42 which disconnects the apparatus from electrical power if the temperature inside the unit reaches a predetermined level. The toasting apparatus is also provided with a main power switch 11 and with a fuse 33 and fuse holder 44 for protecting against overcurrent.

The toasting apparatus is equipped with a flexible metallic variable speed conveyer belt 27 for conveying products through the apparatus. The metallic conveyor belt 27 may include a master link 28 for assembling the belt. The conveyor belt 27 is positioned in the unit on drive shaft 3 and idler shaft 2. A drive motor 8 is connected to drive shaft 3 through motor sprocket 22, drive chain 23, and conveyor sprocket 21. Drive motor 8 is provided with variable speed control unit 13 including a dial or knob 14 for adjusting and controlling the speed of the conveyor belt 27.

The configuration and control of the upper or top elements 39 and 39', wherein the front four elements 39 are controlled with the rocker-type switch 12 and the rear five elements 39' are controlled with the infinite controller 9, allows the elements to be utilized as "dry" and "toast" zones corresponding to first and second portions of the path of the conveyor belt 27 beneath the two sets of elements, respectively.

The toasting apparatus is equipped with a feeder 31 and feeder support 41. Products to be toasted are placed on the feeder 31 and slide down onto the conveyor. The products are conveyed through the oven and drop from the conveyor belt 27 onto a inclined product slide 5. Toasted products dropping from the conveyor 27 slide down the inclined product slide 5 back to the front of the apparatus. However, the toasting apparatus could be configured as a pass through toaster, with the toasted product exiting the rear of the unit. Left and right side covers 33 and 34 are provided to enclose the apparatus. Legs 29 are provided to support the apparatus. The toasting apparatus is also equipped with a cooling fan 18 which is mounted in back panel 32 and covered with fan guard 37.

Referring now to FIG. 3 the wiring and controls of the improved toasting apparatus 100 are illustrated. Electrical power is supplied to the apparatus through plug 202 and terminal block 204. Main power switch 11 controls the supply of power to the apparatus 100. As noted above, infinite controllers 9 and 25 control the power to top heating elements 39' and bottom heating element 7. Speed controller 13 controls the speed of drive motor 8 which drives conveyor belt 27.

In operation, the toasting apparatus 100 may be used in two different modes. In the first mode, the apparatus is used to toast moist or dense products such as bagels or English muffins. In this mode both the front top elements 39 and rear top elements 39' are energized along with bottom element 7. In this mode, the portion of the path of the conveyor belt 27 corresponding to the front top heating elements 39 functions as a drying zone and the portion of the path of the conveyor belt 27 extending under the rear top drying elements 39' operates as a drying zone. Adjustments to the infinite controller 9 and 25 and to the conveyor belt speed controller 13 allow for adjustment of the amount of heat supplied and the duration of time that the product is exposed. In particular, infinite controller 9 may be adjusted to vary the amount of heat supplied by the rear top drying elements 39' to color and appearance of the toasted product. Thus, the toasting operation can be optimized for moist or dense products such as bagels or English muffins. Additionally, the unit could be operated without energizing the bottom element 7 for toasting delicate products on a single side.

In a second mode, rocker-type on/off switch 12 is placed in the off position and the front top heating elements 39 are de-energized. In this mode the unit may be used to toast uniform products such as bread slices. The speed of conveyor belt 27 and amount of heat supplied by bottom heating element 7 and rear top heating elements 39' may be adjusted as described above to provide the optimum heat and toast duration.

Although the invention has been illustrated in the accompanying Drawings and described in the foregoing Detailed Description, it will be appreciated by those skilled in the art that various modifications and rearrangements of the component parts and elements of the present invention are possible without departing from the spirit and scope of the invention. The following claims are intended to cover all such modifications within the scope of the invention.

I claim:

1. An improved toasting apparatus including:
    a conveyor belt for conveying products through the toaster;
    a bottom heating element positioned below the conveyor belt, said bottom heating element including a controller for controlling the amount of heat provided by the bottom heating element;
    a drying zone for drying products conveyed through the toaster, the drying zone including a first plurality of upper heating elements positioned above the conveyor, the first plurality of upper heating elements including a controller for controlling the first plurality of upper heating elements independent of the bottom heating element; and
    a toasting zone for toasting products conveyed through the toaster, the toasting zone including a second plurality of upper heating elements positioned above the conveyor, the second plurality of upper heating elements including a controller for controlling the amount of heat provided by the second plurality of upper heating elements, the second plurality of upper heating elements being controlled independently of the bottom heating element and the first plurality of upper heating elements.

2. The apparatus of claim 1 further comprising a product slide positioned below the conveyor belt.

3. The apparatus of claim 1 further comprising an infinite controller for controlling the bottom heating element, the infinite controller controlling the amount of heat provided by cycling the bottom heating element on and off in a ratio according to a control setting.

4. The apparatus of claim 1 further comprising a variable speed controller for controlling the speed of the conveyor.

5. The apparatus of claim 1 further comprising an on/off switch for energizing and de-energizing the first plurality of upper heating elements.

6. The apparatus of claim 1 wherein the second plurality of upper heating elements further comprises an infinite controller for controlling the second plurality of upper heating elements independent of the bottom heating element and the first plurality of upper heating elements, the infinite controller controlling the amount of heat provided by cycling the second plurality of upper heating elements on and off in a ratio according to a control setting.

7. An improved toasting apparatus including:
    a conveyor belt for conveying products through the toaster, the conveyor belt defining a path through the toasting apparatus;
    a bottom heating element positioned below the conveyor belt, said bottom heating element including a variable controller for controlling the amount of heat provided by the bottom heating element;
    a first plurality of upper heating elements, the first plurality of upper heating elements positioned above a first portion of the path of the conveyor, the first plurality of upper heating elements including a controller for controlling the first plurality of upper heating elements independent of the bottom heating element; and
    a second plurality of upper heating elements positioned above a second portion of the path of the conveyor, the second plurality of upper heating elements including a variable controller for controlling the amount of heat provided by the second plurality of upper heating elements, the second plurality of upper heating elements being controlled independently of the bottom heating element and the first plurality of upper heating elements.

8. The apparatus of claim 7 further comprising a product slide positioned below the conveyor belt.

9. The apparatus of claim 7 further comprising an infinite controller for controlling the bottom heating element, the infinite controller controlling the amount of heat provided by cycling the bottom heating element on and off in a ratio according to a control setting.

10. The apparatus of claim 1 further comprising a variable speed controller for controlling the speed of the conveyor.

11. The toaster of claim 7 further comprising an on/off controller for energizing and de-energizing the first plurality of upper heating elements.

12. The toaster of claim 7 further comprising an infinite controller for controlling the second plurality of upper heating elements independent of the bottom heating element and the first plurality of upper heating elements, the infinite controller controlling the amount of heat provided by cycling the second plurality of upper heating elements on and off in a ratio according to a control setting.

13. An improved toasting apparatus including:

conveyor means for conveying products through the toaster;

bottom heating means positioned below the conveyor means, said bottom means including control means for controlling the amount of heat provided by the bottom heating means; the control means controlling the amount of heat provided by cycling the bottom heating means on and off in a ratio according to a control setting;

drying zone means for drying products conveyed through the toaster, the drying zone means including first upper heating means, the first upper heating means including on/off control means; and toasting zone means for toasting products conveyed through the toaster, the toasting zone means including second upper heating means, the second upper heating means including an infinite control means for controlling the amount of heat provided by the second upper heating means, the infinite control means controlling the amount of heat provided by cycling the second upper heating means on and off in a ratio according to a control setting.

14. The apparatus of claim 13 further comprising product return means positioned below the conveyor belt for returning the toasted product to the front of the apparatus.

15. The apparatus of claim 14 wherein the product return means comprises a product slide positioned below the conveyor belt.

16. The apparatus of claim 13 wherein the first upper heating means comprises a first plurality of upper heating elements.

17. The apparatus of claim 13 further comprising a variable speed controller for controlling the speed of the conveyor means.

18. The apparatus of claim 13 wherein the bottom heating means comprises a heating element positioned below the conveyor belt and an infinite controller for controlling the amount of heat provided by the bottom heating element.

* * * * *

UNITED STATES PATENT AND TRADEMARK OFFICE
CERTIFICATE OF CORRECTION

PATENT NO. : 5,746,116
DATED : May 5, 1998
INVENTOR(S) : Mark J. Smith

It is certified that error appears in the above-identified patent and that said Letters Patent is hereby corrected as shown below:

Column 2, line 20, delete "10" and insert –45—
Column 2, line 37, delete "45" and insert –10—
Column 2, line 53, delete "33" and insert –43--

Signed and Sealed this

First Day of December, 1998

*Attest:*

BRUCE LEHMAN

*Attesting Officer*        *Commissioner of Patents and Trademarks*